(12) United States Patent
Wang

(10) Patent No.: US 11,178,382 B1
(45) Date of Patent: Nov. 16, 2021

(54) AUTO-CALIBRATION OF STEREOSCOPIC IMAGING DEVICE

(71) Applicant: ShopperTrak RCT Corporation, Chicago, IL (US)

(72) Inventor: Zhiqian Wang, Lisle, IL (US)

(73) Assignee: ShopperTrak RCT Corporation, Chicago, IL (US)

( * ) Notice: Subject to any disclaimer, the term of this patent is extended or adjusted under 35 U.S.C. 154(b) by 0 days.

(21) Appl. No.: 17/081,576

(22) Filed: Oct. 27, 2020

(51) Int. Cl.
  *H04N 5/232* (2006.01)
  *H04N 13/246* (2018.01)
  *G06T 7/80* (2017.01)

(52) U.S. Cl.
  CPC .............. *H04N 13/246* (2018.05); *G06T 7/85* (2017.01)

(58) Field of Classification Search
  CPC ................................ H04N 13/246; G06T 7/85
  USPC .......................................................... 348/47
  See application file for complete search history.

(56) References Cited

U.S. PATENT DOCUMENTS

2012/0033051 A1* 2/2012 Atanassov ........... H04N 13/239
  348/49

* cited by examiner

*Primary Examiner* — Nguyen T Truong
(74) *Attorney, Agent, or Firm* — Arent Fox LLP

(57) ABSTRACT

Disclosed herein are systems and methods for calibrating a stereoscopic imaging device. An example implementation includes receiving, at a processor, a plurality of image pairs from the stereoscopic imaging device and calculating, for each image pair in the plurality of image pairs, a respective row delta value indicative of a deviation along a horizontal axis between the first image captured by the first sensor and the second image captured by the second sensor. The implementation further includes determining a median row delta value based on each respective row delta value and subsequently a set of respective disparities in one or more features in the first image and the second image based on the median row delta value. The method further includes calculating a column delta value and calibrating the stereoscopic imaging device using the median row delta value and the column delta value.

15 Claims, 6 Drawing Sheets

US 11,178,382 B1

AUTO-CALIBRATION OF STEREOSCOPIC IMAGING DEVICE

TECHNICAL FIELD

Aspects of the present disclosure relate generally to imaging devices, and more particularly, to auto-calibration of stereoscopic imaging devices.

BACKGROUND

Stereoscopic imaging devices feature two lenses that can be used to estimate depth in a captured view. The two lenses are calibrated to provide accurate imaging and measurements. It is found, however, that factory calibrated stereoscopic imaging devices may become de-calibrated due to environmental factors (e.g., temperature change, vibration, or some unknown external influences). In this case, the relative positions (including translational and directional positions) among the two lenses and respective sensors drift away from their original positions set during the factory calibration. Because a part of the calibration parameters obtained from the calibration process are dependent on the relative positions among the two lens and the two sensors, the change will make the calibration parameters less accurate and will negatively impact the obtained images, thereby also negatively affecting the accuracy of subsequent processes, such as image analysis and object counting.

Accordingly, there exists a need for improvements in stereoscopic imaging devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for calibrating a stereoscopic imaging device, comprising receiving, at a processor, a plurality of image pairs from the stereoscopic imaging device, wherein each image pair comprises a first image of a scene captured by a first sensor of the stereoscopic imaging device and a second image of the scene captured by a second sensor of the stereoscopic imaging device. The method further includes calculating, at the processor and for each image pair in the plurality of image pairs, a respective row delta value indicative of a deviation along a horizontal axis between the first image captured by the first sensor and the second image captured by the second sensor. The method further includes determining a median row delta value based on each respective row delta value. The method further includes determining a set of respective disparities in one or more features in the first image and the second image based on the median row delta value. The method further includes calculating a column delta value equal to a difference between a median disparity value based on each of the set of respective disparities and a predetermined disparity value, wherein the column delta value is indicative of a deviation along a vertical axis between the first image captured by the first sensor and the second image captured by the second sensor. The method further includes calibrating the stereoscopic imaging device using the median row delta value and the column delta value.

Another example implementation includes an apparatus for calibrating a stereoscopic imaging device, comprising a memory and a processor in communication with the memory. The processor is configured to receive a plurality of image pairs from the stereoscopic imaging device, wherein each image pair comprises a first image of a scene captured by a first sensor of the stereoscopic imaging device and a second image of the scene captured by a second sensor of the stereoscopic imaging device. The processor is configured to calculate, for each image pair in the plurality of image pairs, a respective row delta value indicative of a deviation along a horizontal axis between the first image captured by the first sensor and the second image captured by the second sensor. The processor is configured to determine a median row delta value based on each respective row delta value. The processor is configured to determine a set of respective disparities in one or more features in the first image and the second image based on the median row delta value. The processor is configured to calculate a column delta value equal to a difference between a median disparity value based on each of the set of respective disparities and a predetermined disparity value, wherein the column delta value is indicative of a deviation along a vertical axis between the first image captured by the first sensor and the second image captured by the second sensor. The processor is configured to calibrate the stereoscopic imaging device using the median row delta value and the column delta value.

Another example implementation includes an apparatus for calibrating a stereoscopic imaging device, comprising means for receiving, at a processor, a plurality of image pairs from the stereoscopic imaging device, wherein each image pair comprises a first image of a scene captured by a first sensor of the stereoscopic imaging device and a second image of the scene captured by a second sensor of the stereoscopic imaging device. Additionally, the apparatus further includes means for calculating, at the processor and for each image pair in the plurality of image pairs, a respective row delta value indicative of a deviation along a horizontal axis between the first image captured by the first sensor and the second image captured by the second sensor. The apparatus further includes means for determining a median row delta value based on each respective row delta value. The apparatus further includes means for determining a set of respective disparities in one or more features in the first image and the second image based on the median row delta value. The apparatus further includes means for calculating a column delta value equal to a difference between a median disparity value based on each of the set of respective disparities and a predetermined disparity value, wherein the column delta value is indicative of a deviation along a vertical axis between the first image captured by the first sensor and the second image captured by the second sensor. The apparatus further includes means for calibrating the stereoscopic imaging device using the median row delta value and the column delta value.

Another example implementation includes a computer-readable medium for calibrating a stereoscopic imaging device, executable by a processor to receive, at a processor, a plurality of image pairs from the stereoscopic imaging device, wherein each image pair comprises a first image of a scene captured by a first sensor of the stereoscopic imaging device and a second image of the scene captured by a second sensor of the stereoscopic imaging device. Additionally, the instructions are further executable to calculate, at the processor and for each image pair in the plurality of image pairs, a respective row delta value indicative of a deviation along a horizontal axis between the first image captured by the first sensor and the second image captured by the second sensor. The instructions are further executable to determine a median row delta value based on each respective row delta value. The instructions are further executable to determine a set of respective disparities in one or more features in the first image and the second image based on the median row delta value. The instructions are further executable to calculate a column delta value equal to a difference between a median disparity value based on each of the set of respective disparities and a predetermined disparity value, wherein the column delta value is indicative of a deviation along a vertical axis between the first image captured by the first sensor and the second image captured by the second sensor. The instructions are further executable to calibrate the stereoscopic imaging device using the median row delta value and the column delta value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure, where dashed lines may represent optional components, and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes an auto calibration approach for adjusting the optical center of the right/left sensor in a stereoscopic imaging device based on a plurality of pairs of images from both sensors. This allows the image locations of a same physical feature in rectified images to be aligned and a disparity between them to accurately determine a distance from the physical feature to image planes of the sensors.

Traditionally, manual calibration works based on an assumption that most central areas in images do not have objects above the ground and feature points extracted for auto-calibration are from the ground level. Because of the limitations imposed by this assumption, images (e.g., snapshots, frames, etc.) are taken when the traffic is light, and the calibration adjustment derived requires double checking before being applied on the device. These limitations prevent manual calibration from being used in real time on the device.

The present disclosure presents an enhancement to conventional calibration techniques such that the adjustment is calculated directly on the device without human intervention. The calculation is performed in two separate stages. The first stage involves performing a row delta calculation only over a set of images captured over a first (e.g., relatively short) period of time. Only a relatively short period of time is needed because the row delta calculation may use features from all heights. The second stage involves performing a column delta calculation with the row delta set to the row delta value derived from the first stage. In some aspects, the second stage takes more frames than the first stage over a second (e.g., relatively long) period of time (e.g., >=45 minutes) to reduce the influence of objects above the ground in the scene. The column delta calculation needs to reliably extract features only on the ground. The ground feature collection needs more frames.

Figure 1:
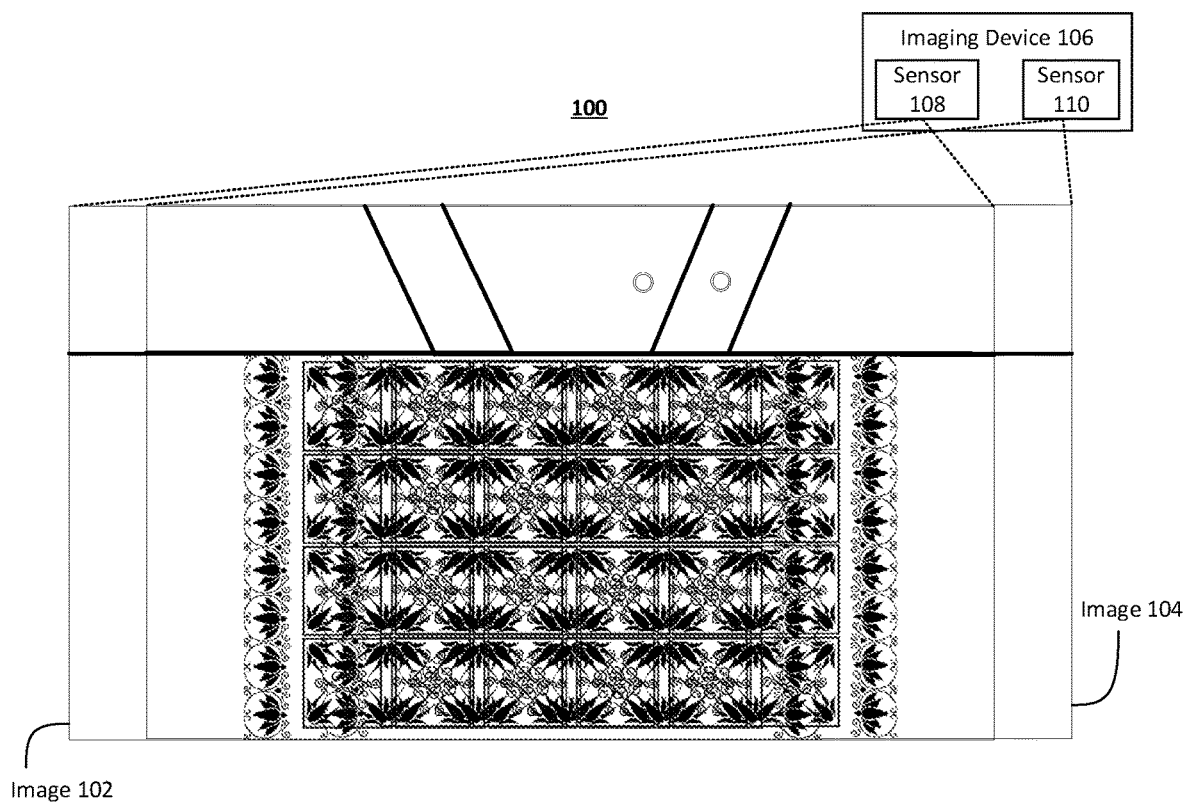
FIG. 1 is an example of two misaligned images from sensors in a stereoscopic imaging device that needs calibration, in accordance with exemplary aspects of the present disclosure.

FIG. 1 depicts example 100 of two misaligned images from sensors in a stereoscopic imaging device 106 that needs calibration, in accordance with exemplary aspects of the present disclosure. Image 102 is captured by a left-side sensor (e.g., sensor 108) of stereoscopic image device 106 and image 104 is captured by a right-side sensor (e.g., sensor 110) of stereoscopic image device 106. Although both images show the same objects (e.g., door, door knob, and rug) from an overhead perspective, the locations of the objects relative to each image are much farther away than they are supposed to be. As shown, the flat pattern in the image is from the ground and the disparity between the left and right images does not reflect the correct camera height.

Figure 2:
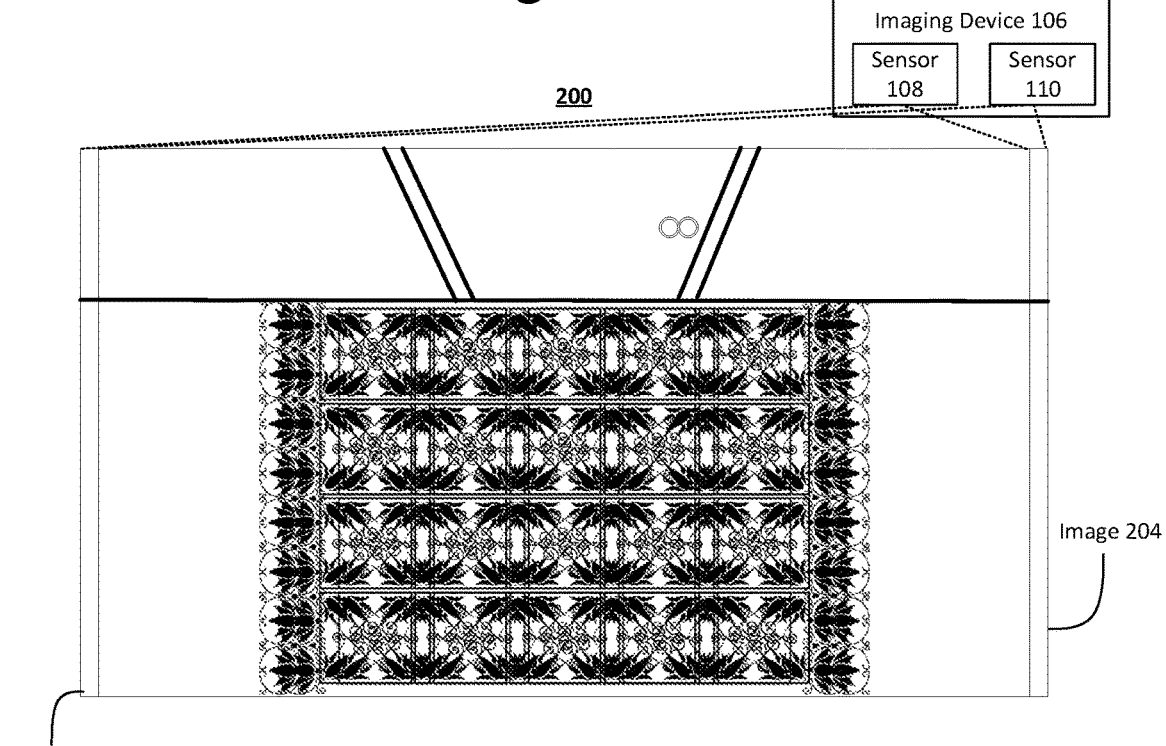
FIG. 2 is an example of an image output from a calibrated stereoscopic imaging device, in accordance with exemplary aspects of the present disclosure.

FIG. 2 depicts example 200 of image outputs (i.e., image 202, 204) from a calibrated stereoscopic imaging device 106, in accordance with exemplary aspects of the present disclosure. By using the auto-calibrating component 415 (described in FIG. 4) of the present disclosure, the misalignment can be corrected, resulting in proper image outputs where all common features in image 202 and image 204 are distanced by an appropriate amount (e.g., depending on the distance between sensors 108 and 110 and parallax). In the end, the flat pattern in the image is from the ground and the disparity between the left and right sensors reflects the correct camera height.

Figure 3:
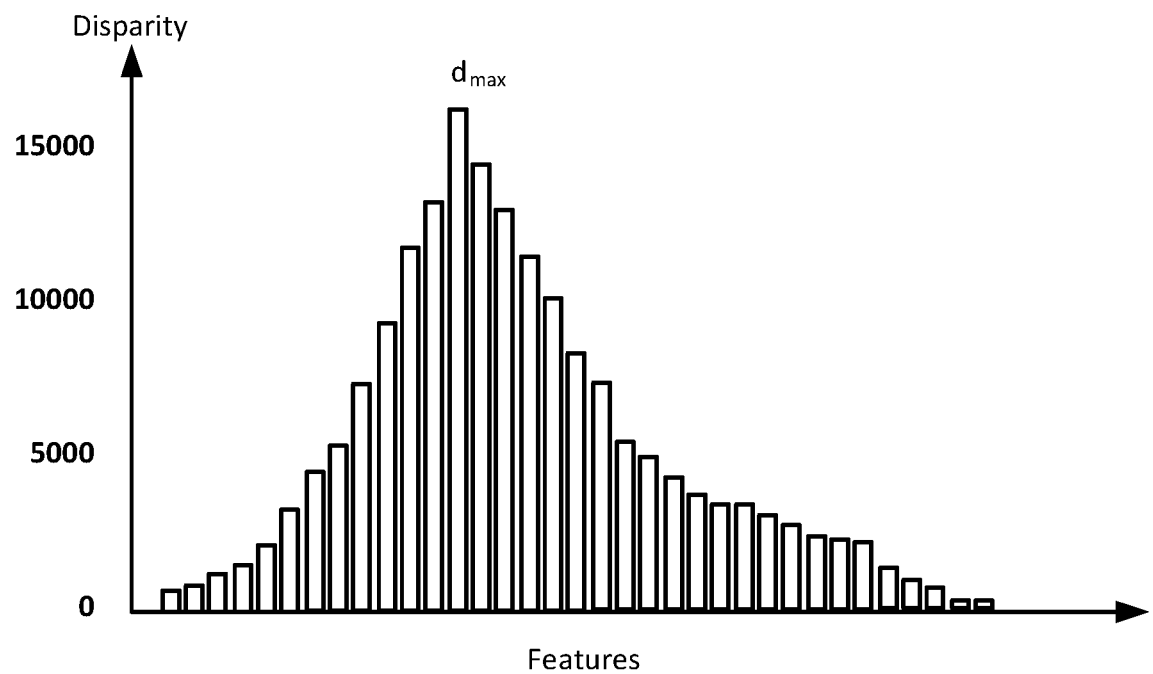
FIG. 3 depicts two histograms that map image disparities to image features, in accordance with exemplary aspects of the present disclosure.
Figure 3:
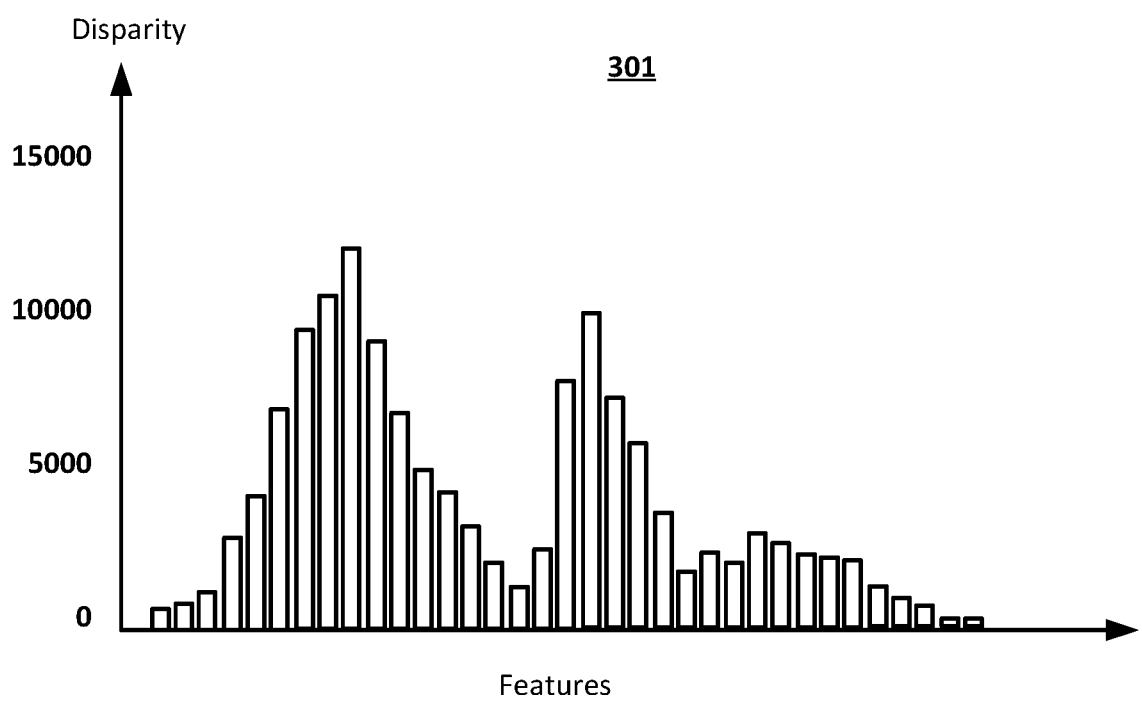

FIG. 3 depicts two histograms 300 and 301 that map image disparities to image features, in accordance with exemplary aspects of the present disclosure. To achieve proper alignment, disparities are determined amongst different features in the images.

Figure 5:
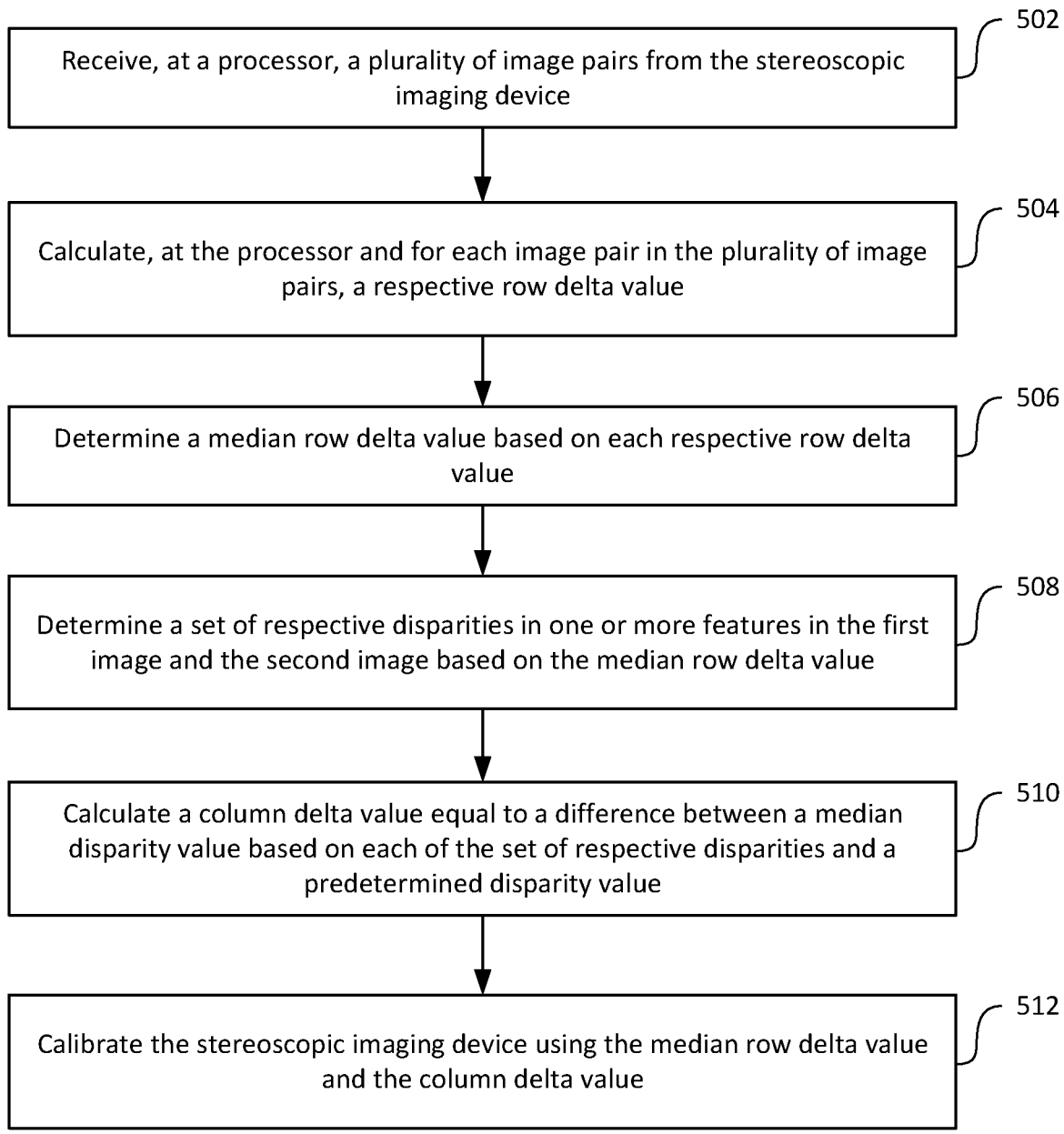
FIG. 5 is a flow diagram illustrating a method for calibrating a stereoscopic imaging device, in accordance with exemplary aspects of the present disclosure.

These disparities specifically aid in the calculation of a column delta value and are further discussed in FIG. 5.

Figure 4:
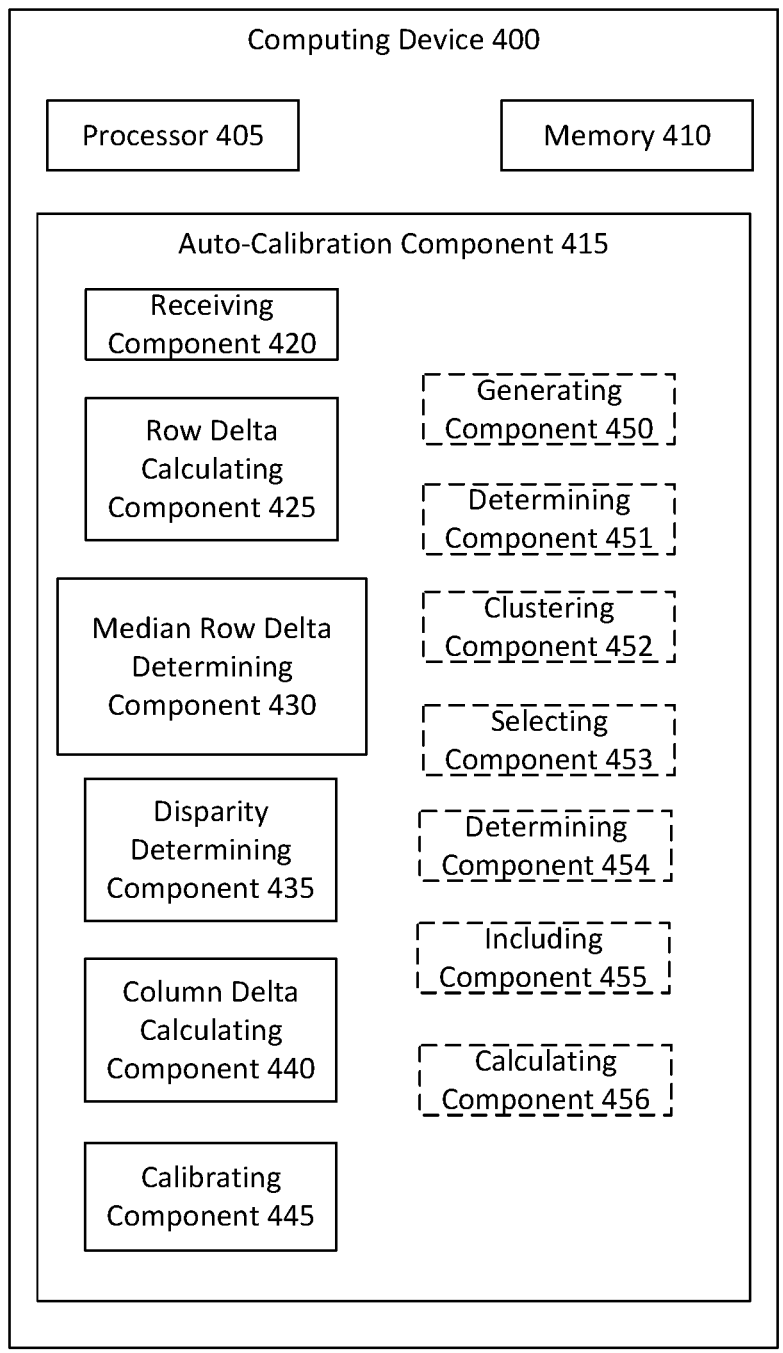
FIG. 4 is a block diagram of a computing device executing an auto-calibration component, in accordance with exemplary aspects of the present disclosure.

FIG. 4 is a block diagram of computing device 400 executing an auto-calibration component 415, in accordance with exemplary aspects of the present disclosure. In theory, the calibration parameters include 4 groups of parameters:

$$\overline{\Omega}^L = \{(F_x^L, F_y^L), (O_x^L, O_y^L)\alpha^L, (K_0^L, K_1^L, K_2^L, K_3^L, K_4^L)\},$$

$$\overline{\Omega}^R = \{(F_x^R, F_y^R), (O_x^R, O_y^R)\alpha^R, (K_0^R, K_1^R, K_2^R, K_3^R, K_4^R)\},$$

$$\overline{T} = \{T_x, T_y, T_z\} \text{ and}$$

$$\overline{\Theta} = \{\theta_x, \theta_y, \theta_z\},$$

where $\overline{\Omega}^L$ and $\overline{\Omega}^R$ are intrinsic parameters of the left and right sensors, $(O_x^L, O_y^L)$ and $(O_x^R, O_y^R)$ denote optical centers of left and right imaging systems, $(F_x^L, F_y^L)$ and $(F_x^R, F_y^R)$ denote focal lengths of left and right lenses, $\alpha^L$ and $\alpha^R$ denote skew factors of left and right sensors and are generally set to zero for modern sensors, $(K_0^L, K_1^L, K_2^L, K_3^L, K_4^L)$ and $(K_0^R, K_1^R, K_2^R, K_3^R, K_4^R)$ denote distortions of left and right lenses, $\overline{T}$ and $\overline{\Theta}$ denote the relative translation and rotation of right lens with respect to left lens.

Among the above-noted 26 calibration parameters, focal lengths, lens distortions and skew factors are characteristic parameters of the two lens used, and they are invariable to environmental change. In addition, the relative translation $\overline{T}$ is considered independent of environmental change since in the stereoscopic imaging device, the lenses and sensors are fixed to a circuit board. The remaining 7 parameters, $(O_x^L, O_y^L)$, $(O_x^R, O_y^R)$ and $\overline{\Theta}$, are prone to the relative positional changes among the two lenses and the two sensors.

In an exemplary aspect, the optical axes of two lenses are parallel to each other, the two sensors are placed in the same plane, and the baseline connecting the optical centers of the two sensors is aligned with the rows of the pixel arrays of the two sensors. In this typical hardware setup, the influence on those 7 calibration parameters may be approximated with changes of $(O_x^R, O_y^R)$. In the present disclosure, as implemented by auto-calibration component 415, the change is denoted as $(\Delta_x^R, \Delta_y^R)$ which are represented by two parameters: a column delta value $\Delta_x^R$ and a row delta value $\Delta_y^R$ of the optical center of the right lens respectively. Those two parameters are in terms of pixels in the raw image and they are set to zero in the process of factory calibration.

Suppose that the left and right raw images are denoted as $I^L$ and $I^R$ respectively, the corresponding rectified images are represented with $J^L$ and $J_{(\Delta_x^R, \Delta_y^R)}^R$ and could be built with bilinear interpolation using Eq (1)

$$I^L \xrightarrow{\overline{\Omega}^L, (F_x^{new}, F_y^{new}), (O_x^{new}, O_y^{new})} J^L$$

(1 and Eq (2):

$$I^L \xrightarrow{\overline{\Omega}^L, (F_x^{new}, F_y^{new}), (O_x^{new}, O_y^{new})} J^L \quad (1)$$

$$I^R \xrightarrow{\overline{\Omega}^R, (F_x^{new}, F_y^{new}), (O_x^{new}, O_y^{new}), (\Delta_x^R, \Delta_y^R)} J_{(\Delta_x^R, \Delta_y^R)}^R, \quad (2)$$

where $(F_x^{new}, F_y^{new})$ is the focal length and $(O_x^{new}, O_y^{new})$ is the optical center of the two rectified images. $(O_x^{new}, O_y^{new})$ is set to a fixed point, and $(F_x^{new}, F_y^{new})$ are chosen programmatically so that the left and right rectified images have a common rectangular area which maps to within the boundaries of the both $I^L$ and $I^R$ and is as big as the raw image.

For a given point $\vec{P}=(X, Y, Z)$ in 3D world whose X axis is aligned with the baseline, Y axis is in the image plane and Z axis is perpendicular to the image plane, the projection of $\vec{P}$ in $J^L$ is denoted as $(x^l, y^l)$ and its projection in $J_{(\Delta_x^R, \Delta_y^R)}^R$ is denoted as $(x^r, y^r)$. For a stereoscopic imaging device without any de-calibration $((\Delta_x^R, \Delta_y^R)=(0,0))$, the relationships in Eq (3) hold:

$$y^l = y^r \text{ and } x^r - x^l = F_x^{new} * T\_x/Z \quad (3)$$

Equivalently, given the projections of a point in the two rectified images, the column offset (or disparity) of the projections can be used to infer the height of the corresponding point in 3D world. In general, the projections of the same point in the two rectified images are found by looking for matching points in the same row of the two images with some type of cost minimization process.

If the device is de-calibrated, either or both equal relationships in Eq. (3) will not hold any more. Then, the projections of the same point would not appear in the same row of the two rectified images (row misalignment), and/or the offset of the projections in the two images cannot be used to infer the height correctly (column misalignment). Accordingly, the auto-calibration component 415 finds the best $(\Delta_x^R, \Delta_y^R)$ so that Eq. (3) holds as much as possible, or equivalently:

$$\min_{\Delta_y^R} |y^l - y^r| \text{ and } \min_{\Delta_x^R} |x^r - x^l - F_x^{new} * T\_x/Z| \quad (4)$$

Generally, the row alignment of the rectified images will mostly be affected by $\Delta_y^R$ and the column alignment is mostly affected by $\Delta_x^R$. The effect of $\Delta_y^R$ on row alignment is independent of the distance of the points of interest in the scene to the stereoscopic imaging device and it is considered that the row is in alignment when $|\Delta_y^R|$ is less than half pixels. On the other hand, the influence of $\Delta_x^R$ on column alignment is dependent on the distance of objects of interest in the scene to the camera. With the same $\Delta_x^R$, the error introduced in height measurement is different for objects at different height. The further the objects of interest are from away from the camera, the larger the error introduced by the same amount of $\Delta_x^R$. The maximum allowed column delta change $\Delta_x^R$ is determined by both the focal length and the camera height. Given the maximum allowed error in height measurement at the ground level, the maximum allowed column delta $\Delta_x^R$ is inversely proportional to squared camera height.

FIG. 5 is a flowchart illustrating method 500 of calibrating a stereoscopic imaging device, in accordance with exemplary aspects of the present disclosure.

Referring to FIG. 4 and FIG. 5, in operation, computing device 400 may perform method 500 of calibrating the stereoscopic imaging device via execution of auto-calibration component 415 by processor 405 and/or memory 410. In some aspects, computing device 400 is the stereoscopic imaging device 106. In other aspects, computing device 400 is an external device capable of communicating with the stereoscopic imaging device 106 (e.g., wirelessly via the Internet or through a wired connection such as via a USB cable).

At block 502, the method 500 includes receiving a plurality of image pairs from the stereoscopic imaging device. For example, in an aspect, computing device 400, processor 405, memory 410, auto-calibration component 415, and/or receiving component 420 may be configured to or may comprise means for receiving a plurality of image pairs from the stereoscopic imaging device (e.g., computing device 400), wherein each image pair comprises a first image of a scene captured by a first sensor (e.g., image 102) of the stereoscopic imaging device and a second image of the scene captured by a second sensor of the stereoscopic imaging device (e.g., image 104). In some aspects, the scene includes one or more feature points, wherein the first image includes a first set of feature points corresponding to the one or more feature points, and wherein the second image includes a second set of feature points that correspond to the one or more feature points.

Because the respective images may be misaligned, the stereoscopic imaging device 106 requires calibration. As discussed previously, the auto-calibration component 415 finds the best $(\Delta_x^R, \Delta_y^R)$ to optimize Ep (3). In one aspect, the row delta and column delta may be calculated based on a single pair of images from left and right sensors at the same time. To increase the reliability of the estimation, auto-calibration component 415 may perform the calculation over a set of image pairs captured over time and may perform the row delta and column delta calculation in two separate stages. The first stage is to calculate the row delta, because the row delta calculation is not affected by object above ground in the scene and can be finished in short amount of time.

At block 504, the method 500 includes calculating, for each image pair in the plurality of image pairs, a respective row delta value indicative of a deviation along a horizontal axis between the first image captured by the first sensor and the second image captured by the second sensor. For example, in an aspect, computing device 400, processor 405, memory 410, auto-calibration component 415, and/or row delta calculating component 425 may be configured to or may comprise means for calculating, for each image pair in the plurality of image pairs, the respective row delta value. In some aspects, each image pair in the plurality of image pairs is captured a period of time apart.

Let $\overline{\Delta}_{y,i}^R$ represent the row delta estimation from a single pair of images $P_i$. When a single pair estimation is performed over N pairs of images captured 1-minute apart, the following equation applies:

$$\overline{\Delta}_{y,T}^R = \{\overline{\Delta}_{y,1}^R, \ldots, \overline{\Delta}_{y,N}^R\} \quad (5)$$

In order to calculate a single $\overline{\Delta}_{y,i}^R$, A pair of rectified images $J^L$ and $J_{(\Delta_x^R,\Delta_y^R)}^R$ are created with $(\Delta_x^R, \Delta_y^R)=(0,0)$. Each image is divided into a predetermined amount of sub-areas. Row delta calculating component 425 may determine the row delta value for each in at most two iterations with the first iteration applied to a subset of the sub-areas, and the second iteration to all sub-areas until at least three pairs of matching feature points are found.

A set of feature points $FP^L=\{(x_i^L, y_i^L), i=1 \ldots N^L\}$ are detected in related areas of $j^L$ and another set of feature points $FP^R=\{(x_j^R, y_j^R), j=1 \ldots M^R\}$ are detected in same areas of $J_{(0,0)}^R$.

For each point $(x_i^L, y_i^L)$ in $FP^L$, row delta calculating component 425 repeats the following steps. Firstly, row delta calculating component 425 obtains a subset $FP_i^R$ of points from $FP^R$ according to Eq (6):

$$FP_i^R = \{(x_m^R, y_m^R) | y_m^R - y_i^L| < R^1, C_{min}^1 < x_m^R - x_i^L < C_{max}^1, (x_m^R, y_m^R) \in FP^R\} \quad (6),$$

where $R^1$, $C_{min}^1$ and $C_{max}^1$ define a rectangular area in $J_{(\Delta_x^R,\Delta_y^R)}^R$ to collect the subset of feature points. By default, $R^1=10$, $C_{min}^1=-15$ and $C_{max}^1=1000$. The size of $FP_i^R$ may be denoted as $M_i^R$.

Second, for each point $(x_m^R, y_m^R)$ in $FP_i^R$, row delta calculating component 425 applies a feature extraction function, such as a Kanade-Lucas-Tomasi (KLT) feature tracker. $(x_i^L, y_i^L)$ is used as the reference point and $(x_m^R, y_m^R)$ is used as the starting point of KLT feature tracker. The KLT tracker will update $(x_m^R, y_m^R)$ iteratively until it finds a point in $J_{(0,0)}^R$ whose neighboring pixels will best match the neighboring pixels around $(x_i^L, y_i^L)$ in $J^L$. The final point from the KLT tracker is denoted $(\tilde{x}_m^R, \tilde{y}_m^R)$. Thus, an updated sub-set $\widetilde{FP}_i^R = \{(\tilde{x}_m^R, \tilde{y}_m^R), m=1 \ldots M_i^R\}$ from $FP_i^R$ is obtained and duplicated points in $\widetilde{FP}_i^R$ are removed.

Third, for each point $(\tilde{x}_m^R, \tilde{y}_m^R)$ in $\widetilde{FP}_i^R$, row delta calculating component 425 calculates a cross correlation between a small window centered at $(\tilde{x}_m^R, \tilde{y}_m^R)$ in $J_{(0,0)}^R$ and a window centered at $(x_i^L, y_i^L)$ in $J^L$. If the correlation is less than 0.9, then $(\tilde{x}_m^R, \tilde{y}_m^R)$ is removed from $\widetilde{FP}_i^R$.

Fourth, row delta calculating component 425 checks the size of final $\widetilde{FP}_i^R$. If it is zero, then $(x_i^L, y_i^L)$ doesn't have a matching point. If it is more than one, $(x_i^L, y_i^L)$ has multiple matching points and $(x_i^L, y_i^L)$ is ignored.

After repeating the above steps for each point $(x_i^L, y_i^L)$ in $FP^L$, row delta calculating component 425 acquires a set of matching pairs with corresponding row offset:

$$MP = \{d_{yk} = \tilde{y}_k^R - y_k^L, (x_k^L, y_k^L) \text{ matching } (\tilde{x}_k^R, \tilde{y}_k^R) \ k=1 \ldots K\} \quad (7)$$

In some aspects, row delta calculating component 425 may then apply an outlier removal algorithm on MP in terms of $d_y$, and reject matching feature points which are close to regions with glare (i.e. saturated pixels in the image). The final set of row offsets is obtained as:

$$MR = \{d_{yk}, k=1 \ldots \tilde{K}\} \quad (8)$$

If $\tilde{K} \geq 3$, then the row delta is calculated as:

$$\overline{\Delta}_y^R = \frac{(F_x^L + F_x^R)/2}{F_x^{new}} * \frac{1}{\tilde{K}} \sum_{k=1}^{\tilde{K}} d_{yk} \quad (9)$$

If $\tilde{K} < 3$, row delta calculating component 425 recalculates the row delta in a second iteration for all sub-areas in an image. If $\tilde{K} < 3$ for the second iteration, the algorithm stops and row delta calculating component 425 reports a no feature found error on the stereoscopic imaging device.

At block 506, the method 500 includes determining a median row delta value based on each respective row delta value. For example, in an aspect, computing device 400, processor 405, memory 410, auto-calibration component 415, and/or median row delta determining component 430 may be configured to or may comprise means for determining a median row delta value based on each respective row delta value.

In some aspects, the median row delta value is a Minimum Mean Absolute Error (MMAE) estimation of each respective row delta value. Accordingly, median row delta determining component 430 obtains a Minimum Mean Absolute Error (MMAE) estimation of row delta based on a set of row delta estimates from a set of pairs of images:

$$RD_{MMAE} = \text{median}(\overline{\Delta}_{y,T}^R) \quad (10)$$

At block 508, the method 500 includes determining a set of respective disparities in one or more features in the first image and the second image based on the median row delta value. For example, in an aspect, computing device 400, processor 405, memory 410, auto-calibration component 415, and/or disparity determining component 435 may be configured to or may comprise means for determining a set of respective disparities in one or more features in the first image and the second image based on the median row delta value.

With the median row delta value $RD_{MMAE}$ calculated according to Eq. (10), another pair of rectified images $J^L$ and $J_{(\Delta_x^R, \Delta_y^R)}^R$ are created with $(\Delta_x^R, \Delta_y^R) = (0, RD_{MMAE})$. Disparity determining component 435 then applies a stereo matching algorithm, such as an Efficient Large-scale Stereo Matching algorithm, to $J^L$ and $J_{(0, \Delta_y^R)}^R$ to create a pair of dense disparity maps $D^L$ and $D^R$. For each of the disparity maps $D^L$ and $D^R$, a set of respective disparities in one or more features in the first image and the second image is determined. In some aspects, the set of respective disparities are disparity histograms $H^L$ and $H^R$, which are created according to the following equations:

$$H^L = \{N_d, N_d = \text{number of } (x,y) \text{ so } D^L(x,y) = d, d = 0, \ldots, 0\} \quad (11)$$

$$H^R = \{N_d, N_d = \text{number of } (x,y) \text{ so } D^R(x,y) = d, d = 0, \ldots, 0\} \quad (12)$$

where $[0, \ldots, 0]$ is the range of disparities of $D^L$ and $D^R$.

It is assumed that the pixels in the set of areas in the images considered are mostly projections of real world points at ground level. The two histograms $H^L$ and $H^R$ will generally have single peaks at $d_{max}^L$ and $d_{max}^R$ respectively (e.g., see histogram 300). In addition, $d_{max}^L$ and $d_{max}^R$ should be the same or differ with one pixel at most. However, the two histograms may have multiple peaks as shown in histogram 301 when there are repetitive patterns in the scene or there are objects above ground level. With multiple peaks in the histogram, disparity determining component 435 cannot simply use the disparity with the most number of pixels.

In some aspects, to cope with multiple peaks in the histograms, disparity determining component 435 may apply a clustering algorithm, such as a mean shift based clustering algorithm, to the histogram first. If there is only one cluster (see 300), the disparity at the peak is used. If there are multiple clusters, the disparity $d_{max}^i$ at the peak of the cluster i is used when $d_{max}^i$ is within a predefined range of $d_{ground}^{true} = (F\_x \hat{\ } new * T\_x)/Z_{ground}$, i.e. $|d_{ground}^{true} - d_{max}^i| < d_{threshold}$, where $d_{threshold}$ defaults to 7, $Z_{ground}$ is the distance of ground to the camera and $d_{ground}^{true}$ is the expected disparity at ground level. If no cluster satisfies the above range check, no initial ground level disparity can be derived and the algorithm fails in column delta calculation.

When the stereoscopic imaging device is in calibration, $d_{ground}^{true}$ should be close to $d_{max}^L$ and $d_{max}^L$ within one pixel. If the camera is de-calibrated, $d_{ground}^{true}$ might differ with $d_{max}^L$ and $d_{max}^R$ by several pixels. $d_{max}^L$ and $d_{max}^R$ are obtained at pixel level since the disparity maps $D^L$ and $D^R$ only have pixel level disparities. They may be used as the initial ground level disparities in next step to for estimation of ground level disparities at sub-pixel level.

In summary, once the median row delta value is estimated as in described in block 504, a dense disparity map of good quality should be readily available. In the dense disparity map, objects at different heights will yield different disparities and the floor will contribute the largest number of pixels with the same disparity. If a histogram of all disparities in the disparity map is created and the histogram has single mode, the peak value will reflect the disparity from floor level with current column delta setting as in histogram 300. If the histogram has multiple peaks as in histogram 301, it should be considered that there are multiple large flat objects at different heights in the scene and the frame is not useable for column delta estimation.

For a histogram with single peak, the peak value is the perceived floor disparity and it may differ from the desired disparity at the floor height. The difference between the peak value and the desired value are from the wrong column delta being used. The feature points in the image with disparity not far from the peak value can be collected as samples for estimation of the correct column delta in next step.

At block 510, the method 500 includes calculating a column delta value equal to a difference between a median disparity value based on each of the set of respective disparities and a predetermined disparity value, wherein the column delta value is indicative of a deviation along a vertical axis between the first image captured by the first sensor and the second image captured by the second sensor. For example, in an aspect, computing device 400, processor 405, memory 410, auto-calibration component 415, and/or column delta calculating component 440 may be configured to or may comprise means for calculating the column delta value equal to the difference between the median disparity value based on each of the set of respective disparities and the predetermined disparity value (e.g., a ground level disparity).

Figure 7:
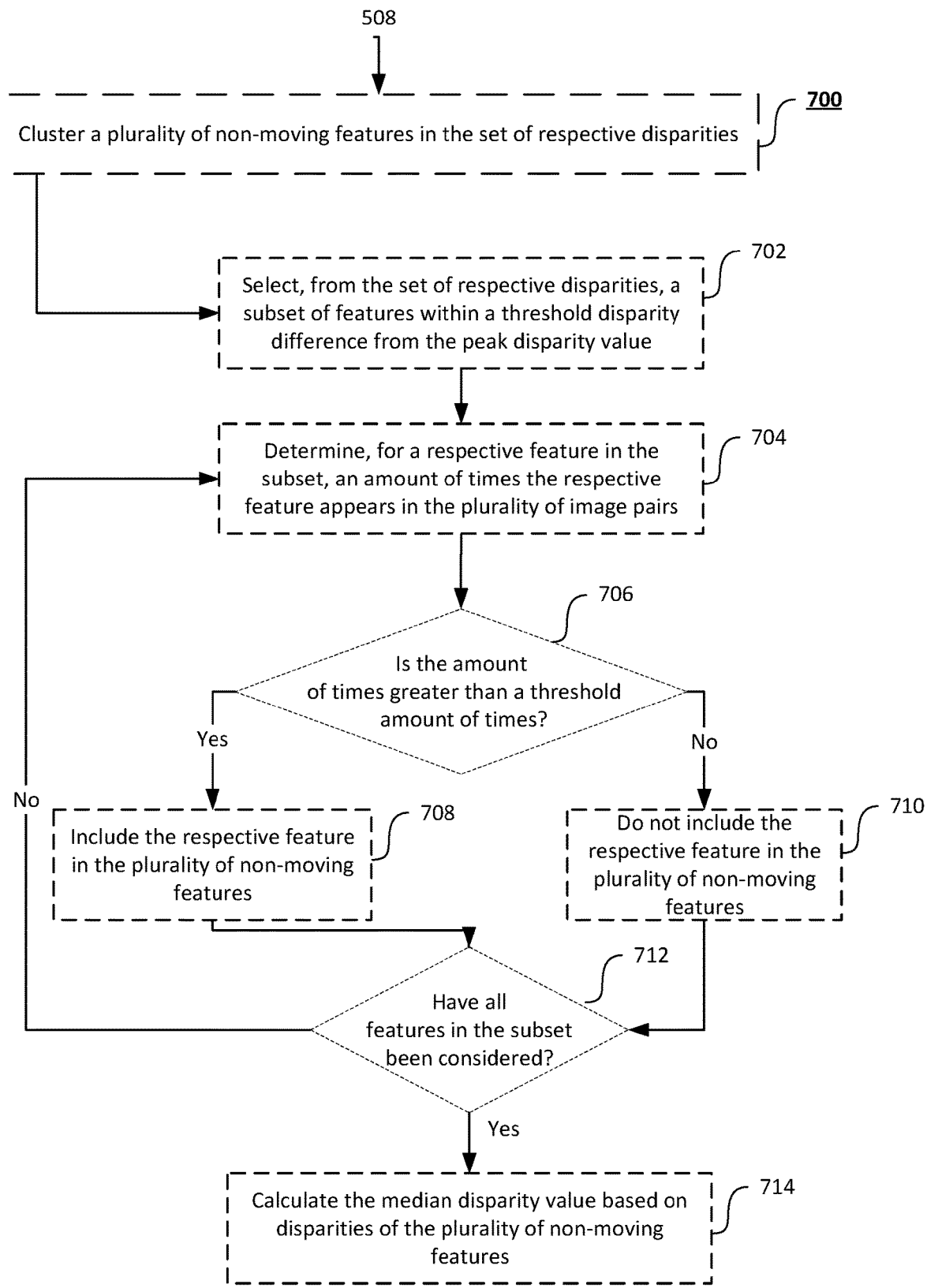
FIG. 7 is a flow diagram illustrating a method for clustering a plurality of non-moving features in a set of respective disparities, in accordance with exemplary aspects of the present disclosure.

In some aspects, some feature points may be filtered (discussed in FIG. 7). In an overview, from the feature points kept for final estimation FIG. 7, column delta calculating component 440 determines a set of column disparities $D = \{D_1, \ldots, D_P\}$, where P is the number of feature points in the set. From there, column delta calculating component 440 determines a Minimum Mean Absolute Error (MMAE) estimation of the current floor level disparity $D_{floor}$ = median (D) and the final column delta is then obtained as $$CD_{MMAE} = D_{floor} - D_{desired} \quad (13)$$

where $D_{desired}$ is the desired disparity at floor level at the given camera height.

In order to determine $\Delta_x^R$, the following is considered. Once the initial ground level disparities $d_{max}^L$ and $d_{max}^R$ are acquired, column delta calculating component 440 estimates the ground level disparity at sub-pixel level for more accurate estimation of the column delta value $\Delta_x^R$. To achieve this goal, the feature detection and tracking algorithms in block 504 are applied to the pair of rectified images $J^L$ and $J_{(0, \Delta_y^R)}^R$ created in block 508. Although the algorithms are the same as in block 504, their algorithm parameters are quite different. For example, in block 504, row delta calculating component 425 may have only detected 100 feature points which are at least 20 pixel apart in related areas. In block 510, column delta calculating component 440 may detect as many feature points as possible which are 7 pixel apart in related areas. For feature tracking, column delta calculating component 440 uses a much smaller search range in feature point matching. This step will be applied at most three iterations with the first iteration applied to a subset of the sub-areas, the second iteration to a different subset of the sub-areas, and the third iteration to all sub-areas until at least one pair of matching feature points are found.

Beginning with the first iteration, column delta calculating component 440 detects a set of feature points $FP^L =$ $\{(x_i^L, y_i^L), D^L(x_i^L, y_i^L) = d_{max}^L$ or $D^L(x_i^L, y_i^L) d_{max}^R$, $i=1 \ldots N^L\}$ in the subset of sub-areas of $J^L$ only and another set of feature points $FP^R = \{(x_j^R, y_j^R), D^R(x_j^R, y_j^R) = d_{max}^L$ or $D^R(x_j^R, y_j^R) = d_{max}^R$, $j=1 \ldots M^R\}$ in the same sub-areas of $J_{(0,\Delta_y^R)}^R$ with a corner detection algorithm, such as a Harris corner detector.

For each point $(x_i^L, y_i^L)$ in $FP^L$, column delta calculating component 440 repeats the following steps. First, column delta calculating component 440 gets a sub-set $FP_i^R$ of points from $FP^R$ according to $$FP_i^R = \{(x_m^R, y_m^R) | y_m^R - y_i^L | < R^2, C_{min}^2 < x_m^R - x_i^L < C_{max}^2, (x_m^R, y_m^R) \in FP^R\} \quad (14)$$

where $R^2$, $C_{min}^2$ and $C_{max}^2$ define a rectangular area in $J_{(0,\Delta_y^R)}^R$ to collect the sub set of feature points. By default, $R^2 = 1.1$, $C_{min}^2 = D^L(x_i^L, y_i^L) - 2$ and $C_{max}^2 = D^L(x_i^L, y_i^L) + 2$. Column delta calculating component 440 denotes the size of $FP_i^R$ as $M_i^R$.

Second, for each point $(x_m^R, y_m^R)$ in $FP_i^R$, calculating component applies the feature extraction function, such as the Kanade-Lucas-Tomasi (KLT) feature tracker. $(x_i^L, y_i^L)$ is used as the reference point and $(x_m^R, y_m^R)$ is used as the starting point of KLT feature tracker. The KLT tracker will update $(x_m^R, y_m^R)$ iteratively until it finds a point in $J_{(0,\Delta_y^R)}^R$ whose neighboring pixels will best match the neighboring pixels around $(x_i^L, y_i^L)$ in $J^L$. The final point from the KLT tracker is denoted $(\tilde{x}_m^R, \tilde{y}_m^R)$. Thus, we get an updated sub-set $\widetilde{FP}_i^R = \{(\tilde{x}_m^R, \tilde{y}_m^R), m=1 \ldots M_i^R\}$ from $FP_i^R$, duplicated points in $\widetilde{FP}_i^R$ are removed.

Third, for each point $(\tilde{x}_m^R, \tilde{y}_m^R)$ in $\widetilde{FP}_i^R$, column delta calculating component 440 calculates a cross correlation between a small window centered at $(\tilde{x}_m^R, \tilde{y}_m^R)$ in $J_{(0,\Delta_y^R)}^R$ and a window centered at $(x_i^L, y_i^L)$ in $J^L$ is calculated. If the correlation is less than 0.9, then $(\tilde{x}_m^R, \tilde{y}_m^R)$ is removed from $\widetilde{FP}_i^R$.

Lastly, column delta calculating component 440 checks the size of final $\widetilde{FP}_i^R$. If it is zero, then $(x_i^L, y_i^L)$ doesn't have a matching point. If it is more than one, $(x_i^L, y_i^L)$ has multiple matching points and is ignored by column delta calculating component 440.

For the remaining one point $(\tilde{x}_0^R, \tilde{y}_0^R)$ of $\widetilde{FP}_i^R$, column delta calculating component 440 verifies whether $|\tilde{y}_0^R - y_i^L| < R^2$ and $C_{min}^2 < \tilde{x}_0^R - x_i^L < C_{max}^2$. If the verification fails, $(\tilde{x}_0^R, \tilde{y}_0^R)$ is not the matching feature point to $(x_i^L, y_i^L)$. It should be rejected if $(\tilde{x}_0^R, \tilde{y}_0^R)$ is close to regions with glare (i.e. saturated pixels in the image).

After repeating the above steps for each point $(x_i^L, y_i^L)$ in $FP^L$, column delta calculating component 440 acquires a set of matching pairs with corresponding column offset:

$$MP = \{d_{xk} = \tilde{x}_k^R - x_k^L, (x_k^L, y_k^L) \text{ matching } (\tilde{x}_k^R, \tilde{y}_k^R) k = 1 \ldots K\} \quad (15)$$

Then, column delta calculating component 440 estimates the sub-pixel level ground disparity $d_{ground}^0$ without column delta adjustment as $$d_{ground}^0 = \frac{1}{K}\sum_{k=1}^{K} d_{xk} \quad (16)$$

Subsequently column delta calculating component 440 determines an optimal column delta $\Delta_{xk}^R$ for $k=1 \ldots K$. For each pair, column delta calculating component 440 first extracts a small patch $P_k^L$ of image centered at $(x_k^L, y_k^L)$ from $J^L$. Then, a series of patches $P_{km}^R$ of image centered at $(d_{ground}^{true} + \tilde{x}_k^R - x_k^L - d_{ground}^0, y_k^L)$ from $J_{(c_m,\Delta_y^R)}^R$, where $c_m$ denotes a specific column delta from a range $(\Delta x - 2, \Delta x + 2)$ and $\Delta x$ is derived by column delta calculating component 440 as $$\Delta x = (d_{ground}^0 - d_{ground}^{true}) * \frac{(F_x^L + F_x^R)/2}{F_x^{new}} \quad (17)$$

Since only a small patch is needed from $J_{(c_m,\Delta_y^R)}^R$, it not necessary to build whole rectified image $J_{(c_m,\Delta_y^R)}^R$, resulting in an efficient reconstruction process. Then, column delta calculating component 440 calculates the cross correlation between $P_k^L$ and $P_{km}^R$ and denotes it as $S(C_m)$, $C_m \in (\Delta x - 2, \Delta x + 2)$. The optimal $\Delta_{xk}^R$ is chosen for the maximal $S(C_m)$ $$\Delta_{xk}^R = \max_{C_m \in (\Delta x - 2, \Delta x + 2)} S(C_m) \quad (18)$$

After acquiring the optimal $\Delta_{xk}^R$ for each pair in MP, the optimal column delta $\Delta_x^R$ is obtained as the average of them $$\Delta_x^R = \frac{1}{K}\sum_{k}^{K} \Delta_{xk}^R \quad (19)$$

At block 512, the method 500 includes calibrating the stereoscopic imaging device using the median row delta value and the column delta value. For example, in an aspect, computing device 400, processor 405, memory 410, auto-calibration component 415, and/or calibrating component 445 may be configured to or may comprise means for calibrating the stereoscopic imaging device using the median row delta value and the column delta value. For example, calibrating component 445 may set the initial row delta value to the median row delta value and the initial column delta value to the determined column delta value.

Figure 6:
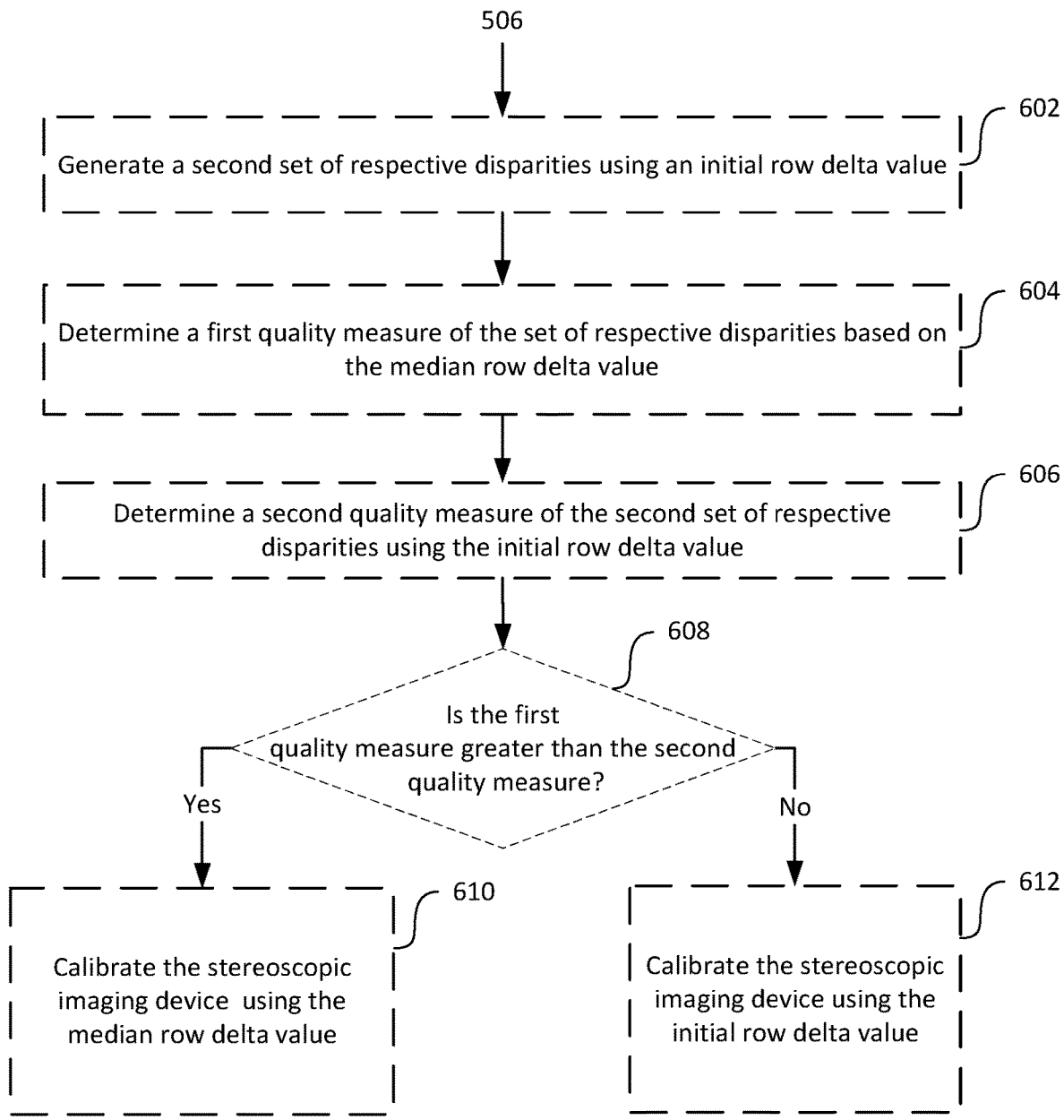
FIG. 6 is a flow diagram illustrating a method for selecting a row delta value for calibration, in accordance with exemplary aspects of the present disclosure.

FIG. 6 is a flow diagram illustrating method 600 for selecting a row delta value for calibration, in accordance with exemplary aspects of the present disclosure. Method 600 is optional and may be executed by auto-calibration component 415 after block 506 and before block 508.

At block 602, the method 600 includes generating a second set of respective disparities using an initial row delta value. For example, in an aspect, computing device 400, processor 405, memory 410, auto-calibration component 415, and/or generating component 450 may be configured to or may comprise means for generating a second set of respective disparities using an initial row delta value.

At block 604, the method 600 includes determining a first quality measure of the set of respective disparities based on the median row delta value. For example, in an aspect, computing device 400, processor 405, memory 410, auto-calibration component 415, and/or determining component 451 may be configured to or may comprise means for determining a first quality measure of the set of respective disparities based on the median row delta value. At block 606, the method 600 includes determining a second quality measure of the second set of respective disparities using the initial row delta value. For example, in an aspect, computing device 400, processor 405, memory 410, auto-calibration component 415, and/or determining component 451 may be configured to or may comprise means for determining a second quality measure of the second set of respective disparities using the initial row delta value.

In terms of determining the quality measures, auto-calibration component 415 may determine disparity maps (i.e., a visual form of the first and second set of respective disparities). The quality of a disparity map is determined by the row alignment of the left and the right rectified images. If the two rectified images are out of row alignment, feature points from the same object in the world space in the two images would not be on the same line. Feature matching will fail to find the correct disparity and then the correct height information of the physical feature point to the counting device is not obtained. A quantitative measurement of Quality of Disparity (QoD) is defined as follows:

$$QoD = \Sigma A_{large} / \Sigma A_{small} \quad (20)$$

where $A_{large}$ is the area of large unified portions (e.g., of the same color of either black or white) in a disparity map whose area is larger than a given threshold (default to 1000) and $A_{small}$ is the area of small blobs in the disparity map whose area are smaller than the threshold. Accordingly, the first quality measure is $QoD_1$ and the second quality measure is $QoD_2$.

At block 608, the method 600 includes determining whether the first quality measure is greater than the second quality measure. For example, in an aspect, computing device 400, processor 405, memory 410, auto-calibration component 415, and/or determining component 451 may be configured to or may comprise means for determining whether the first quality measure is greater than the second quality measure. In response to determining that the first quality measure is greater than the second quality measure, method 600 proceeds to 610. Otherwise, method 600 proceeds to 612.

At block 610, the method 600 includes calibrating the stereoscopic camera using the median row delta value. For example, in an aspect, computing device 400, processor 405, memory 410, auto-calibration component 415, and/or calibrating component 445 may be configured to or may comprise means for calibrating the stereoscopic camera using the median row delta value. At block 612, the method 600 includes calibrating the stereoscopic camera using the initial row delta value. For example, in an aspect, computing device 400, processor 405, memory 410, auto-calibration component 415, and/or calibrating component 445 may be configured to or may comprise means for calibrating the stereoscopic camera using the initial row delta value. In other words, auto-calibration component 415 compares the quality of disparity with the initial row delta value and the median row delta value and picks the one with a better quality measure.

FIG. 7 is a flow diagram illustrating method 700 for clustering a plurality of non-moving features in a set of respective disparities, in accordance with exemplary aspects of the present disclosure. For example, in an aspect, computing device 400, processor 405, memory 410, auto-calibration component 415, and/or clustering component 452 may be configured to or may comprise means for clustering a plurality of non-moving features in the set of respective disparities.

The feature points sampled from a single frame contain their pixel locations and disparities. Since the feature points are collected around the floor level and may be from objects above the floor, all of the disparity samples cannot be used to estimate the disparity at ground level. In order to remove outliers, clustering component 452 samples the feature points over multiple frames (e.g., more than 45 frames) captured one minute apart and performs location-based filtering on all the collected feature points.

At block 702, the method 700 includes selecting, from the set of respective disparities, a subset of features within a threshold disparity difference from the peak disparity value. For example, in an aspect, computing device 400, processor 405, memory 410, auto-calibration component 415, and/or selecting component 453 may be configured to or may comprise means for selecting, from the set of respective disparities, a subset of features within a threshold disparity difference from the peak disparity value. For example, referring to histogram 300, selecting component 453 may select features within a disparity difference of 500 from $d_{max}$.

At block 704, the method 700 includes determining, for a respective feature in the subset, an amount of times the respective feature appears in the plurality of image pairs. For example, in an aspect, computing device 400, processor 405, memory 410, auto-calibration component 415, and/or determining component 454 may be configured to or may comprise means for determining, for a respective feature in the subset, an amount of times the respective feature appears in the plurality of image pairs. This is needed to filter out moving features that do not constantly stay in the frame.

At block 706, the method 700 includes determining whether the amount of times is greater than a threshold amount of times. For example, in an aspect, computing device 400, processor 405, memory 410, auto-calibration component 415, and/or determining component 454 may be configured to or may comprise means for determining whether the amount of times is greater than a threshold amount of times. If the amount of times is greater than the threshold amount of times, method 700 proceeds to 708. Otherwise, method 700 proceeds to 710.

At block 708, the method 700 includes including the respective feature in the plurality of non-moving features. For example, in an aspect, computing device 400, processor 405, memory 410, auto-calibration component 415, and/or including component 455 may be configured to or may comprise means for including the respective feature in the plurality of non-moving features.

At block 710, the method 700 includes not including the respective feature in the plurality of non-moving features. For example, in an aspect, computing device 400, processor 405, memory 410, auto-calibration component 415, and/or including component 455 may be configured to or may comprise means for not including the respective feature in the plurality of non-moving features.

At block 712, the method 700 includes determining whether all features in the subset have been considered. For example, in an aspect, computing device 400, processor 405, memory 410, auto-calibration component 415, and/or determining component 454 may be configured to or may comprise means for determining whether all features in the subset have been considered. If all of them have been considered, method 700 proceeds to block 714. Otherwise, method 700 returns to block 704 and another respective feature is considered.

At block 714, the method 700 includes calculating the median disparity value based on disparities of the plurality of non-moving features. For example, in an aspect, computing device 400, processor 405, memory 410, auto-calibration component 415, and/or calculating component 456 may be configured to or may comprise means for calculating the median disparity value based on disparities of the plurality of non-moving features.

For example, let $F''_i$ be a feature point from frame n, $F''_i=(X''_i, Y''_i, D''_i)$ $i \in [1, M'']$, where $(X''_i, Y''_i)$ is the location of the feature map, and $D''_i$ is the disparity of the feature point, $M''$ is the number of feature points collected from frame n. The filtering will be performed by clustering component 452 on a count map C, where the value of C at a location is the counts of feature points collected at that location over time:

$$C(i,j) = \Sigma^k \Sigma^f 1(i==X^k_f \&\& j==Y^k_f), f \in [1,M''], k \in [1,N] \quad (21)$$

where N is the number of frames, $1(\ldots)$ is the indicator function of the predicate $i==X^k_f$ and $j==Y^k_f$.

A neighbor clustering approach is applied to the count map C such that the points in the cluster are eight-connected with transitive property. Each cluster has a total count equal to the sum of the count of the points in the cluster. The total counts of clusters from non-moving feature points in the scene should be far greater than the total counts of clusters from moving feature points in the scene. The total count of each cluster is compared against a predefined threshold, if the total count in the cluster is less than the threshold, all feature points in the cluster are ignored. Otherwise, the feature points in the cluster will be used for final MMAE estimation.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for calibrating a stereoscopic imaging device, comprising:
   receiving, at a processor, a plurality of image pairs from the stereoscopic imaging device, wherein each image pair comprises a first image of a scene captured by a first sensor of the stereoscopic imaging device and a second image of the scene captured by a second sensor of the stereoscopic imaging device;
   calculating, at the processor and for each image pair in the plurality of image pairs, a respective row delta value indicative of a deviation along a horizontal axis between the first image captured by the first sensor and the second image captured by the second sensor;
   determining a median row delta value based on each respective row delta value;
   determining a set of respective disparities in one or more features in the first image and the second image based on the median row delta value;
   calculating a column delta value equal to a difference between a median disparity value based on each of the set of respective disparities and a predetermined disparity value, wherein the column delta value is indicative of a deviation along a vertical axis between the first image captured by the first sensor and the second image captured by the second sensor; and
   calibrating the stereoscopic imaging device using the median row delta value and the column delta value.

2. The method of claim 1, further comprising:
   generating a second set of respective disparities using an initial row delta value prior to determining the median row delta value;
   determining a first quality measure of the set of respective disparities based on the median row delta value;
   determining a second quality measure of the second set of respective disparities using the initial row delta value; and
   calibrating the stereoscopic imaging device using the median row delta value in response to determining that the first quality measure is greater than the second quality measure.

3. The method of claim 1, wherein each respective disparity in the set of respective disparities is of a respective feature point in an image pair, further comprising:
   prior to calculating the column delta value, clustering a plurality of non-moving features in the set of respective disparities; and
   calculating the median disparity value based on disparities of the plurality of non-moving features.

4. The method of claim 3, wherein a peak disparity value in the set of respective disparities is of a floor captured in the plurality of image pairs, and wherein clustering the plurality of non-moving features comprises:
   selecting, from the set of respective disparities, a subset of features within a threshold disparity difference from the peak disparity value;
   determining, for each respective feature, an amount of times the respective feature appears in the plurality of image pairs; and
   in response to determining that the amount of times is greater than a threshold amount of times, including the respective feature in the plurality of non-moving features.

5. The method of claim 1, wherein each image pair in the plurality of image pairs is captured a period of time apart.

6. The method of claim 1, further comprising:
   determining whether the set of respective disparities comprises more than one peak disparity value; and
   in response to determining that the set of respective disparities comprises more than one peak disparity value, selecting a different image pair and determining another dense disparity map of the different image pair for calculating the column delta value.

7. The method of claim 1, wherein the median row delta value is a Minimum Mean Absolute Error (MMAE) estimation of each respective row delta value.

8. An apparatus for calibrating a stereoscopic imaging device, comprising:
   a memory; and
   a processor in communication with the memory and configured to:
      receive a plurality of image pairs from the stereoscopic imaging device, wherein each image pair comprises a first image of a scene captured by a first sensor of the stereoscopic imaging device and a second image of the scene captured by a second sensor of the stereoscopic imaging device;
      calculate, for each image pair in the plurality of image pairs, a respective row delta value indicative of a deviation along a horizontal axis between the first image captured by the first sensor and the second image captured by the second sensor;
      determine a median row delta value based on each respective row delta value;

determine a set of respective disparities in one or more features in the first image and the second image based on the median row delta value;

calculate a column delta value equal to a difference between a median disparity value based on each of the set of respective disparities and a predetermined disparity value, wherein the column delta value is indicative of a deviation along a vertical axis between the first image captured by the first sensor and the second image captured by the second sensor; and calibrate the stereoscopic imaging device using the median row delta value and the column delta value.

9. The apparatus of claim 8, wherein the processor is further configured to:

generate a second set of respective disparities using an initial row delta value prior to determining the median row delta value;

determine a first quality measure of the set of respective disparities based on the median row delta value;

determine a second quality measure of the second set of respective disparities using the initial row delta value; and calibrate the stereoscopic imaging device using the median row delta value in response to determining that the first quality measure is greater than the second quality measure.

10. The apparatus of claim 8, wherein each respective disparity in the set of respective disparities is of a respective feature point in an image pair, wherein the processor is further configured to:

prior to calculating the column delta value, cluster a plurality of non-moving features in the set of respective disparities; and calculate the median disparity value based on disparities of the plurality of non-moving features.

11. The apparatus of claim 10, wherein a peak disparity value in the set of respective disparities is of a floor captured in the plurality of image pairs, and wherein the processor is further configured to cluster the plurality of non-moving features by:

selecting, from the set of respective disparities, a subset of features within a threshold disparity difference from the peak disparity value;

determining, for each respective feature, an amount of times the respective feature appears in the plurality of image pairs; and in response to determining that the amount of times is greater than a threshold amount of times, including the respective feature in the plurality of non-moving features.

12. The apparatus of claim 8, wherein each image pair in the plurality of image pairs is captured a period of time apart.

13. The apparatus of claim 8, wherein the processor is further configured to:

determine whether the set of respective disparities comprises more than one peak disparity value; and in response to determining that the set of respective disparities comprises more than one peak disparity value, select a different image pair and determining another dense disparity map of the different image pair for calculating the column delta value.

14. The apparatus of claim 8, wherein the median row delta value is a Minimum Mean Absolute Error (MMAE) estimation of each respective row delta value.

15. A computer-readable medium for auto-configuring a region of interest (ROI) associated with a camera, executable by a processor to:

receive a plurality of image pairs from the stereoscopic imaging device, wherein each image pair comprises a first image of a scene captured by a first sensor of the stereoscopic imaging device and a second image of the scene captured by a second sensor of the stereoscopic imaging device;

calculate for each image pair in the plurality of image pairs, a respective row delta value indicative of a deviation along a horizontal axis between the first image captured by the first sensor and the second image captured by the second sensor;

determine a median row delta value based on each respective row delta value;

determining a set of respective disparities in one or more features in the first image and the second image based on the median row delta value;

calculate a column delta value equal to a difference between a median disparity value based on each of the set of respective disparities and a predetermined disparity value, wherein the column delta value is indicative of a deviation along a vertical axis between the first image captured by the first sensor and the second image captured by the second sensor; and calibrate the stereoscopic imaging device using the median row delta value and the column delta value.

\* \* \* \* \*